US005693682A

United States Patent [19]
Kuczynski et al.

[11] Patent Number: 5,693,682
[45] Date of Patent: Dec. 2, 1997

[54] INTEGRAL SKIN FOAM AND PROCESS FOR PRODUCTION THEREOF

[75] Inventors: Edward T. Kuczynski, Troy; William M. Bayko, Flat Rock, both of Mich.

[73] Assignee: Woodbridge Foam Corporation, Mississauga, Canada

[21] Appl. No.: 604,071

[22] Filed: Feb. 20, 1996

[51] Int. Cl.$^6$ .................................................. C08G 18/30
[52] U.S. Cl. ..................... 521/51; 521/159; 521/164; 521/166; 521/176; 521/173
[58] Field of Search ..................... 521/51, 159, 164, 521/166, 176, 173

[56] References Cited

U.S. PATENT DOCUMENTS

| | | | |
|---|---|---|---|
| 4,469,823 | 9/1984 | Yeakey et al. | 521/172 |
| 4,554,340 | 11/1985 | Heusch et al. | 528/77 |
| 4,590,219 | 5/1986 | Nissen et al. | 521/51 |
| 4,994,502 | 2/1991 | Markovs et al. | 521/137 |
| 5,132,329 | 7/1992 | Lynch et al. | 521/51 |
| 5,234,961 | 8/1993 | Tanis | 521/51 |
| 5,304,573 | 4/1994 | Tamano et al. | 521/51 |
| 5,426,124 | 6/1995 | Neuhaus et al. | 521/51 |
| 5,464,879 | 11/1995 | Valoppi | 521/51 |

OTHER PUBLICATIONS

"Flexible Polyurethane Foams" by R. Herrington, et al.; 1991, pp. 12.16–12.19.

The Polyurethanes Book; George Woods; 1987; pp. 88–100.

D. Klempner and K. Frisch; Polymeric Foams; 1991; pp. 66–67.

*Primary Examiner*—Rachel Gorr
*Attorney, Agent, or Firm*—Fitzpatrick, Cella, Harper & Scinto

[57] ABSTRACT

A polyurethane foam essentially free of organic carbon-based blowing agent, the polyurethane foam comprising a foam core having a density of from about 5 to about 45 pounds per cubic foot and an integral skin consisting of substantially non-cellular, non-porous polyurethane. The presence of the integral skin is characterized by a compression force deflection index of at least about 1.20, the compression force deflection index being defined as the ratio of (i) the compression force deflection orthogonal to a cross-section of the foam to (ii) the compression force deflection of the foam core, the compression force deflection measured according to ASTM 3574C. In a preferred embodiment, the present polyurethane foam is further characterized by a flexural modulus index of at about 1.60. In another preferred embodiment, the present invention is characterized by a density index of at least about 1.60. These additional preferred features of the present polyurethane foam are further characteristics of a foam having a true integral skin. A process for producing a polyurethane foam having an integral skin using a blowing agent essentially free of organic carbon-based compounds is also described. The process comprising the steps of: contacting a polyol mixture, an isocyanate, an aqueous blowing agent, a catalyst and a chain extending agent to produce a reaction mixture, the polyol mixture consisting of a first polyol having an average equivalent weight greater than about 1000 and a second polyol having an average equivalent weight in the range of from about 150 to about 1000; and expanding the reaction mixture to produce the polyurethane foam. The present polyurethane foam can be used in a number of vehicular (e.g. steering wheel covers, arm rests, head rests, etc.) and non-vehicular (e.g. shoe-soling, furniture, toys, etc) applications.

42 Claims, No Drawings

INTEGRAL SKIN FOAM AND PROCESS FOR PRODUCTION THEREOF

BACKGROUND OF THE INVENTION

1. Field of the Invention

The present invention relates to an integral skin polyurethane foam and to a process for production thereof. More particularly, the present invention relates to a polyurethane foam, inter alia, having an integral skin and produced using a blowing agent essentially free of organic carbon-based compounds.

2. Description of the Prior Art

Polyurethane foams having an integral skin are generally known. Such foams are also known as "integral-skin" or "self-skinning" foams.

Generally, integral-skin polyurethane foams have been made using a process in which (i) the gas used for polymer expansion is derived from volatilization of solvents rather than carbon dioxide produced in situ from the conventional water-isocyanate reaction, (ii) together with overpacking of the mold in which the foam is produced. In other words, the conventional approach has been to use physical blowing agents in place of reactive water blowing agent. The physical blowing agents or solvents conventionally used have been organic carbon-based compounds, more particularly halocarbons, such as chlorofluorocarbons (CFC's), hydrohalocarbons such as hydrochlorofluorocarbons (HCFC's), hydrochlorocarbons (HCC's), hydrofluorocarbons (HFC's), and the like.

In the past, by utilizing such solvent-based blowing agents, it has been possible to produce integral-skin polyurethane foams. In cross-section, such integral-skin polyurethane foams would be characterized by a regular cellular core and a non-cellular, non-porous outer skin or surface. The area of the core near the surface is denser and less cellular than the outer skin or surface. The outer skin or surface has a typical thickness in the range of from about 1 to about 5 mm.

The non-porous nature of these prior integral-skin polyurethane foams, facilitated painting and/or coating thereof. Further, these foams could be readily internally pigmented. Accordingly, these foams have been suitable for use in a number of vehicular applications (interior and exterior) such as steering wheel covers, steering wheel center pads, head rests, arm rests, gear lever knobs, complete instrument panels, mirror surrounds, wheel trims, bicycle seats, motorcycle seats and the like. These foams have also been suitable for use in non-vehicular applications such as furniture (e.g. office furniture), toys, shoe soles, shoe insoles, bump stops, protective fenders and the like. See, for example Chapter 12 of FLEXIBLE POLYURETHANE FOAMS, by Herrington et al. (1991) and pages 88–100 of THE ICI POLYURETHANES BOOK, by Woods (1987), the contents of each of which are hereby incorporated by reference.

In the mid-1980's, various government agencies began to scrutinize the use of organic carbon-based compounds such as hydrocarbon- and halocarbon-based blowing agents in light of studies which revealed the potential damage caused by escape of such compounds to and interaction with the ozone layer surrounding the Earth. As a result, the governments of many countries in the world have instituted legislation which significantly curtails or even prohibits the use of organic carbon-based blowing agents such as hydrocarbon- and halocarbon-based blowing agents.

In the art of polyurethane foam, the challenge has been to produce a truly integral-skin polyurethane foam having all the advantages of the prior integral skin polyurethane foam without the use of hydrocarbon- and halocarbon-based blowing agents. Various prior patents have attempted to meet the challenge. See, for example, any of the following:

U.S. Pat. No. 4,994,502 [Markovs et al.],
U.S. Pat. No. 5,132,329 [Lynch et al.],
U.S. Pat. No. 5,234,961 [Tanis],
U.S. Pat. No. 5,304,578 [Tamano], and
U.S. Pat. No. 5,426,124 [Neuhaus et al.], the contents of each of which are hereby incorporated by reference.

Neuhaus et al. is particularly instructive in that the preamble thereof at column 1, lines 42–49 states:

"Attempts have been made to switch entirely to water as an alternative blowing agent. However, the use of water as a blowing agent for semirigid to flexible PUR foams with a compact outer skin presents problems which impose narrow limits on the use of water. Serious disadvantages for the satisfactory processing of water-blown moldings include flow behavior, closed cell structure, and the structure of the surface skin."

Thus, it is recognized in the art that previous attempts to produce integral skin polyurethane foam using water as a blowing agent have been insufficient. Indeed, the solution offered by Neuhaus et al. deviates from using water as a blowing agent and involves the use of organic acid-based blowing agents.

While the prior art has enabled production of polyurethane foam having a non-porous surface, the production of a such a foam having a true integral skin remains a difficult challenge to meet. By "true" integral skin is meant a skin of non-cellular, non-porous polymeric layer covering the foam core, the skin being clearly visible in a cross-section of the foam. This is an important feature of prior art integral skin polyurethane foams blown with organic carbon-based compounds such as halocarbons and hydrohalocarbons, and it is this feature which has been very difficult to achieve with any degree of consistency. Specifically, it was this feature of these prior integral skin polyurethane foams which enabled them to be used, for example, in shoe-soling and steering wheel covers where wear resistance and durability in actual use combined with high flexibility were required properties.

Thus it would be desirable to have a polyurethane foam blown without organic carbon-based compounds and having a true integral skin of a substantially non-porous, non-cellular polyurethane layer. Ideally, when load is applied to the foam in a direction substantially orthogonal to a plane of the integral skin, the foam would be significantly more difficult to compress than the foam core (i.e. without the skin).

SUMMARY OF THE INVENTION

It is an object of the present invention to provide a novel polyurethane foam which obviates or mitigates one or more of the above-identified deficiencies of the prior art.

It is an object of the present invention to provide a novel process for producing such a polyurethane foam.

Accordingly, in one of its aspects, the present invention provides a polyurethane foam essentially free of organic carbon-based blowing agent, the polyurethane foam comprising a foam core having a density of from about 5 to about 45 pounds per cubic foot and an integral skin consisting of substantially non-cellular, non-porous polyurethane, wherein the presence of the integral skin is characterized by a compression force deflection index of at least about 1.2, the compression force deflection index being defined as the ratio of (i) the compression force deflection orthogonal to a cross-section of the foam to (ii) the compression force deflection of the foam core, the compression force deflection measured according to ASTM 3574C.

In another of its aspects, the present invention provides a process for producing a polyurethane foam having an integral skin using a blowing agent essentially free of organic carbon-based compounds, the process comprising the steps of:

contacting a polyol mixture, an isocyanate, an aqueous blowing agent, a catalyst and a chain extending agent to produce a reaction mixture, the polyol mixture consisting of a first polyol having an average equivalent weight greater than about 1000 and a second polyol having an average equivalent weight in the range of from about 150 to about 1000; and expanding the reaction mixture to produce the polyurethane foam.

It has been discovered that, by judicious selection of reactants, it is possible to produce a polyurethane foam having a desirable and unique combination of useful properties. Specifically, the present polyurethane foam is essentially free of organic carbon-based blowing agents such as halocarbons and halohydrocarbons. Thus, the present polyurethane foam may be considered environmental friendly, at least insofar as it does not contain any blowing agent shown to be directly detrimental to the ozone layer surrounding the Earth. Further, the present polyurethane foam has a true integral skin in the sense that a load applied to foam in a direction orthogonal to a plane of the integral skin (i.e. the foam comprising the foam core and the integral skin) to attain a certain compression (e.g. 50 percent of uncompressed state) is at least 20 percent greater than a load applied orthogonal to a cross-section of the foam core (i.e. the integral skin has been removed from the foam) to attain the same compression. To the knowledge of the present inventors, a polyurethane foam having these features has been heretofore unknown. Thus, the integral skin of the present polyurethane foam may be seen visually and is layer of substantially non-porous, non-cellular polyurethane.

In a preferred embodiment, the present polyurethane foam is further characterized by a flexural modulus index (as described hereinbelow) of at about 1.60. In another preferred embodiment, the present invention is characterized by a density index (as described hereinbelow) of at least about 1.60. These additional preferred features of the present polyurethane foam are further characteristics of a foam having a true integral skin.

Those of skill in the art will be able to contemplate many applications for the present polyurethane foam. These include virtually any application in which it is desired to have a foam which absorbs and/or manages energy. It is believed, however, that a particular useful application of the present polyurethane foam will be in vehicular occupant protection. Non-limiting examples of this application include: side door panels, arm rests, headrests, steering wheels, instrument panels, console covers, side impact bag covers, knee bolsters and the like. Another application for the present polyurethane foam is in the production of pillar covers used in vehicular occupant protection. To the knowledge of the present inventors, the use of such a foam in pillar covers as been heretofore unknown.

DETAILED DESCRIPTION OF THE PREFERRED EMBODIMENTS

The present invention is related to, inter alia, a polyurethane foam and to a process for production thereof. As used throughout this specification, the term "polyurethane" is intended to have a broad meaning and includes polyurethane and urea-modified polyurethane. As is known in the art, the term "urea-modified", when used in conjunction with a polyurethane means that up to 50% of the polymer backbone forming linkages have been substituted with urea groups.

The process for producing the present polyurethane foam comprises the steps of:

contacting a polyol mixture, an isocyanate, an aqueous blowing agent, a catalyst and a chain extending agent to produce a reaction mixture, the polyol mixture consisting of a first polyol having an average equivalent weight greater than about 1000 and a second polyol having an average equivalent weight in the range of from about 150 to about 1000; and expanding the reaction mixture to produce the polyurethane foam.

The first step in the present process comprises provision of a reaction mixture comprising a polyol mixture, an isocyanate, an aqueous blowing agent, a catalyst and a chaining extending agent.

The polyol mixture comprises a first polyol having an average equivalent weight greater than about 1000 and a second polyol having an average equivalent weight in the range of from about 150 to about 1000. Since commercially available polyols can be a blend of two or more polyols, reference has been made to the average equivalent weight of each polyol in the polyol mixture. As will be readily understood by those of skill in the art, in certain cases, the average equivalent weight may be similar to or the same as the actual equivalent weight.

As used throughout this specification, the term "equivalent weight" means mass of active hydrogen-containing compound per reactive hydrogen pursuant to the following formula:

$$\text{Equivalent Weight} = M.W./f$$

wherein M.W. is the molecular weight of the compound and f is the number of reactive hydrogens (i.e. functionality) in a molecule of the compound. Thus, one equivalent weight of active hydrogen-containing compound will react stoichiometrically with one equivalent weight of isocyanate.

Since determining the functionality of the polyol can be complex, an alternative and practical way to determine the equivalent weight of a polyol is pursuant to the following equation:

$$\text{Equivalent Weight} = (56.1 \times 1000)/\text{OH Number}$$

wherein OH Number is the hydroxyl number of the polyol. As is known in the art, hydroxyl number can be measured and provides an indication of the number of hydroxyl groups in the polyol which are available for reaction. As is further known in the art, there are various conventional analytical methods for determining the hydroxyl number of a polyol— see, for example, Chapter 2 of FLEXIBLE FOAM FUNDAMENTALS, Herrington et al. (1991) and the references cited therein, the contents of which are incorporated herein by reference. These analytical methods include wet analytical and infrared spectroscopic techniques.

Thus, the polyol mixture used in the present process comprises a first polyol and a second polyol. The first polyol may be considered to be a relatively high average equivalent (or molecular) weight polyol. Of course, those of skill in the art will understand that a mixture of two or more such first polyols may be used. The second polyol may be considered to be a relatively low average equivalent (or molecular) weight polyol. Of course, those of skill in the art will understand that a mixture of two or more such second polyols may be used. Preferably, the polyol mixture comprises from about 40 to about 95 percent by weight of the first polyol and from about 5 to about 60 percent by weight of the second polyol. More preferably, the polyol mixture comprises from about 55 to about 95 percent by weight of the first polyol and from about 5 to about 45 percent by weight of the second polyol. Most preferably, the polyol mixture comprises from about 65 to about 90 percent by weight of the first polyol and from about 10 to about 35 percent by weight of the second polyol.

Beyond the equivalent weight of the first and second polyols discussed above, the exact chemical nature of each polyol is not particularly restricted. For example, the polyol can be made with one or both of ethylene oxide and propylene oxide, and may be a random or block polymer of one or more of polyoxypropylene diols, triols and tetrols, and ethylene oxide-capped diols, triols and tetrols. Generally, if the polyol comprises ethylene oxide, the ethylene oxide will generally be present in amounts of less than about 20% by weight.

The choice of such a polyol is not particularly restricted and is within the purview of a person skilled in the art. For example, the polyol may be a hydroxyl-terminated backbone of a member selected from the group comprising polyether, polyester, polycarbonate, polydiene and polycaprolactone. The polyol may selected from the group comprising hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols and polyalkyleneether triols. The polyol may also be selected from the group comprising adipic acid-ethylene glycol polyester, poly(butylene glycol), poly(propylene glycol) and hydroxyl-terminated polybutadiene—see, for example, British patent number 1,482,213 and U.S. Pat. No. 4,722,946 [to Hostettler], the contents of each of which are incorporated herein by reference.

In another embodiment, the first polyol may comprise a polymer polyol, also known as graft copolymer polyols. As is known in the art, such polyols are generally polyether polyol dispersions which are filled with other organic polymers. Such polymer polyols are useful in load building or improving the hardness of the foam when compared to using modified polyols. Non-limiting examples of useful polymer polyols include: chain-growth copolymer polyols (e.g. containing particulate poly(acrylonitrile), poly(styrene-acrylonitrile) and mixtures thereof), and/or step-growth copolymer polyols (e.g. polyharnstoff dispersions (PHD), polyisocyanate polyaddition (PIPA) polyols, expoxy dispersion polyols and mixtures thereof). For further information on polymer polyols, see, for example, Chapter 2 of FLEXIBLE FOAM FUNDAMENTALS, Herrington et al. (1991) and the references cited therein, the contents of which are incorporated herein by reference. If a polymer polyol is used, it may be present in an amount in the range of from about 5 to 100 percent by weight of the first polyol used in the polyol mixture, the remainder (if any) being unmodified polyol. Of course, those of skill in the art will recognize that the first polyol can be a (i.e. one or more) conventional, unmodified polyol without any polymer polyol being present.

A non-limiting example of the first polyol suitable for use in the polyol mixture include Voranol™ 4701, a polyether polyol having an average equivalent weight of approximately 1600, and commercially available from The Dow Chemical Company.

Non-limiting examples of the second polyol suitable for use in the polyol mixture include: (i) Desmophen™ 2001K, a polyethylene/polybutylene adipate polyester polyol having an average equivalent weight of approximately 985, and commercially available from Bayer Corporation; (ii) Poly-G™ 55-112, a polyether polyol having an average equivalent weight of approximately 500, and commercially available for Olin Corporation; (iii) Terol™ 250, an aromatic polyester polyol based on polyethylene terephthalate having an average equivalent weight of approximately 225, and commercially available from Oxid Inc; and mixtures thereof.

The reaction mixture in the first step in the present process further comprises an isocyanate. Of course, those of skill in the art will recognize that a mixture of two or more isocyanates may be used. The choice of isocyanate suitable for use in the reaction mixture is generally within the purview of a person skilled in the art. Generally, the isocyanate compound suitable for use may be represented by the general formula:

$$Q(NCO)_i$$

wherein i is an integer of two or more and Q is an organic radical having the valence of i. Q may be a substituted or unsubstituted hydrocarbon group (e.g. an alkylene or arylene group). Moreover, Q may be represented by the general formula:

$$Q^1-Z-Q^1$$

wherein $Q^1$ is an alkylene or arylene group and Z is chosen from the group comprising —O—, —O—$Q^1$, —CO—, —S—, —S—$Q^1$—S— and —SO$_2$—. Examples of isocyanate compounds which fall within the scope of this definition include hexamethylene diisocyanate, 1,8-diisocyanato-p-methane, xylyl diisocyanate, (OCNCH$_2$CH$_2$CH$_2$OCH$_2$O)$_2$, 1-methyl-2,4-diisocyanatocyclohexane, phenylene diisocyanates, toluene diisocyanates, chlorophenylene diisocyanates, diphenylmethane-4,4'-diisocyanate, naphthalene-1,5-diisocyanate, triphenylmethane-4,4',4"-triisoeyanate and isopropylbenzene-alpha-4-diisocyanate.

In a preferred embodiment, Q may also represent a polyurethane radical having a valence of i. In this case Q(NCO)$_i$ is a compound which is commonly referred to in the art as a prepolymer. Generally, a prepolymer may be prepared by reacting a stoichiometric excess of an isocyanate compound (as discussed hereinabove) with a polyhydroxyl-containing material or polyol (as discussed hereinabove). In this embodiment, the isocyanate may be, for example, used in proportions of from about 30 percent to about 200 percent stoichiometric excess with respect to the proportion of hydroxyl in the polyol. The prepolymer may then be reacted with a polyol to produce a polyurethane foam or an amine to produce a polyurea-modified polyurethane. As will be demonstrated below, if the polyol used to produce the prepolymer is the chain extending agent (as discussed hereinbelow), it is still necessary to utilize the second polyol in the polyol mixture. Further, the second polyol in the polyol mixture described above should be used in the polyol mixture regardless of whether a similar polyol is used to produce the prepolymer to ensure that a polyurethane foam having an integral skin is produced. Thus, in the context of the present process, a prepolymer should be considered a subset of useful isocyanates and the use thereof does not replace the need to use the polyol mixture discussed hereinabove. A non-limiting example of a prepolymer useful in the present process is commercially available from Bayer Corporation under the tradename Mondur™ PF.

In another embodiment, the isocyanate compound suitable for use in the process of the present invention may be setected from dimers and trimers of isocyanates and diisocyanates, and from polymeric diisocyanates having the general formula:

wherein both i and j are integers having a value of 2 or more, and Q" is a polyfunctional organic radical, and/or, as additional components in the reaction mixture, compounds having the general formula:

wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a =Si—NCO group, isocyanate compounds derived from sulfonamides ($QSO_2NCO$), cyanic acid and thiocyanic acid.

See also for example, British patent No. 1,453,258, the contents of which are incorporated herein by reference.

Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitoluene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof.

A preferred isocyanate is selected from the group comprising 2,4'-diphenylmethane diisocyanate, 4,4'-diphenylmethane diisocyanate and mixtures thereof. A preferred isocyanate of this type is a mixture comprising from about 15 to about 25 percent by weight 2,4'-diphenylmethane diisocyanate and from about 75 to about 85 percent by weight 4,4'-diphenylmethane diisocyanate. An example of such an isocyanate is commercially available from Imperial Chemical Industries under the tradename Rubinate M. Another preferred isocyanate of this type is commercially available from BASF Corporation under the tradename Lupranate™ MM-103 (a solvent-free, carbodiimide modified 4,4'-diphenylmethane diisocyanate).

Preferably, the isocyanate used in the present process has a functionality in the range of from about 2.0 to about 2.7.

The isocyanate preferably is used in an amount to provide an isocyanate index, inclusive of all reactive equivalents in the reaction mixture, in the range of about 60 to about 200, more preferably from about 70 to about 140, most preferably from about 90 to about 110.

The reaction mixture used in the first step of the present process further comprises an aqueous blowing agent. As is known in the art, aqueous blowing agents, such as water, can be used as a reactive blowing agent in the production of polyurethane foam. Specifically, water reacts with the isocyanate forming carbon dioxide which acts as the effective blowing agent in the final foamed polymer product. A key advantage of the present process is the ability to produce a polyurethane foam having an integral skin without the need to utilize conventional organic carbon-based blowing agents (e.g. CFC.'s, HCFC's, HFC's, HCC's and the like). As discussed above, the use of such blowing agents is generally being curtailed or even prohibited in some jurisdictions for environmental reasons.

It is known in the art that the amount of water used as a blowing agent in the preparation of a foamed isocyanate-based polymer is conventionally in the range of from about 0.20 to as high as about 5.0 or more parts by weight, preferably from about 0.35 to about 2.0 parts by weight, more preferably from about 0.50 to about 1.2 parts by weight, per one hundred parts by weight of the polyol mixture in the reaction mixture. Since the amount of water used in the production of a polyurethane foam is limited by the fixed properties expected in the foam, it may be necessary, in certain circumstances, to utilize a substantially inert liquid extender if a highly filled (e.g. pigmented) foam is being produced. Non-limiting examples of suitable liquid extenders include halogenated hydrocarbons, high molecular weight hydrocarbons and polyols.

The reaction mixture used in the first step of the present process further comprises a chain extending agent. Generally, the chain extending agent is a compound having at least two functional groups bearing active hydrogen atoms. See, for example, U.S. Pat. Nos. 4,590,219 [Nissen et al.] and 4,994,502 [Markovs et al.], the contents of each of which are hereby incorporated by reference for a discussion of useful chain extending agents. Preferably the chain extending agent is selected from the group consisting of ethylene glycol, diethylene glycol, propylene glycol, 1,4-butanediol and mixtures thereof. The chain extending agent is preferably used in an amount in the range of from about 1 to about 15, more preferably from about 2 about 12, most preferably from about 4 to about 10, parts by weight per one hundred parts by weight of the polyol mixture.

The reaction mixture used in the first step of the present process further comprises a catalyst. The catalyst promotes reaction of the polyol mixture with the isocyanate. The choice and use of such a catalyst is within the purview of a person skilled in the art. See for example U.S. Pat. Nos. 4,296,213 and 4,518,778, the contents of each of which is incorporated herein by reference. Suitable catalysts include tertiary amines and/or organometallic compounds. Non-limited examples of useful catalysts for use in the present process may be selected from the group consisting of triethylenediamine, N-methylmorpholine, N-ethylmorpholine, diethanolamine, N-cocomorpholine, 1-methyl-4-dimethylaminoethylpiperazine, methoxypropyldimethylamine, N,N,N'-trimethylisopropyl propylenediamine, 3,-diethylaminopropyldiethylamine, dimethylbenzylamine, dibutyltin dilaurate, dibutyltin diacetate, stannous chloride, dibutyltin di-2-ethyl hexanoate, stannous oxide and mixtures thereof. See, for example, U.S. Pat. No. 4,590,219 [Nissen et al.], the contents of which are hereby incorporated by reference, for a discussion of various of these and other suitable catalysts. Preferably, the catalyst is used in an amount in the range of from about 0.20 to about 4.0.

As will be clearly understood by those of skill in the art, it is contemplated that conventional additives in the polyurethane foam art can be used in the present process. Non-limiting examples of such additives include: surfactants (e.g. organo-silicone compounds available under the tradename L-540 Union Carbide), cell openers (e.g. silicone oils), extenders (e.g. halogenated paraffins commercially available as Cereclor S45), cross-linkers (e.g. low molecular weight reactive hydrogen-containing compositions), pigments/dyes, flame retardants (e.g. halogenated organophosphoric acid compounds), inhibitors (e.g. weak acids), nucleating agents (e.g. diazo compounds), anti-oxidants, UV stabilizers (e.g. hydroxybenzotriazoles, zinc dibutyl thiocarbamate, 2,6-ditertiary butylcatechol, hydroxybenzophenones, hindered amines and mixtures thereof), plasticizers (e.g. sulfonated aromatic compounds), bacteriostats (e.g. yeast, fungi and mixtures thereof), anti-static agents (e.g. ionizable metal salts, carboxylic acid salts, phosphate esters and mixtures thereof) and mixtures thereof. The amounts of these additives conventionally used is within the purview of a person skilled in the art—see, for example, Chapter 2 of FLEXIBLE FOAM FUNDAMENTALS, Herrington et al. (1991) and the references cited therein, the contents of which are incorporated herein by reference.

The manner by which the polyol mixture, isocyanate, aqueous blowing agent, chain extending agent and catalyst are contacted in the first step of the present process is not particularly restricted. Thus, it is possible to preblend the components in a separate tank which is then connected to a suitable mixing device for mixing with the aqueous blowing agent and catalyst. Alternatively, it is possible to preblend the polyol mixture with the blowing agent, catalyst, chain extending agent and other additives, if present. This preblend could then be fed to a suitable mixhead (high pressure or low pressure) which would also receive an independent stream of the isocyanate.

Once the polyol mixture, isocyanate, aqueous blowing agent, chain extending agent and catalyst have been contact and, ideally, mixed uniformly, a reaction mixture is formed. This reaction mixture is then expanded to produce the present polyurethane foam. As will be apparent to those of skill in the art, the process of the present invention is useful in the production of slab foam, molded articles, and the like. Thus, as will be apparent to a person skill in the art, the manner by which expansion of the reaction mixture is effected will be dictated by the type of foam being produced.

Further, as discussed above, it is possible, and preferred, to incorporate a coating or painting step in the present process. In one embodiment, a coated/painted molded polyurethane foam having an integral skin may be produced using the present process by initially painting a surface of the mold and thereafter dispensing the reaction mixture into the mold. A preferred example of in-mold painting comprises air atomization application of a pigmented lacquer or polyurethane, preferably polyurethane, paint. Preferably, the paint is based on a preblended mixture comprising an aliphatic isocyanate, a polyester resin, a catalyst, a pigment and a solvent (such a paint is commercially available as Polane Elastomerics G64-series from Sherwin-Williams, Inc.). Ideally, paint is light resistant, flexible and durable. A thin coat of in-mold paint is applied to a mold surface using an air atomizer (spray gun), where the polyurethane reaction is regulated either by, or in combination with, the amount of catalyst or mold temperature. Prior to curing of the polyurethane paint, the polyurethane foamable composition is poured into the mold in the normal fashion. If a laquer paint is used, it should be allowed to dry on the mold surface prior to pouring of the polyurethane foamable composition. The in-mold paint provides a smooth class "A" surface.

A particular advantage of the present process is that it is very well suited to the production of polyurethane foam having an integral skin without the need to utilize an organic carbon-based blowing agent. This advantage obviates the clear disadvantages discussed hereinabove associated with using organic carbon-based blowing agents.

The product of the present process is a polyurethane foam essentially free of organic carbon-based blowing agent, the polyurethane foam comprising a foam core having a density of from about 5 to about 45 pounds per cubic foot and an integral skin consisting of substantially non-cellular, non-porous polyurethane, wherein the presence of the integral skin is characterized by a compression force deflection index of at least about 1.20, the compression force deflection index being defined as the ratio of (i) the compression force deflection orthogonal to a cross-section of the foam to (ii) the compression force deflection of the foam core, the compression force deflection measured according to ASTM 3574C.

Thus, the present polyurethane foam, in cross-section orthogonal to a surface of the foam having an integral skin, requires a significantly high load to compress to a given point when compared to the foam core (i.e. the portion of the foam not including the integral skin). This feature is referred to herein as compression force deflection index which is a relative measure of the compression force deflection of polyurethane foam (i.e. including foam core and the integral skin) and the foam core of the polyurethane foam (i.e. with integral skin removed), the compression force deflection being measured according to ASTM 3574C. The compression deflection index of the present polyurethane foam is greater than 1.20, preferably in the range of from about 1.20 to about 2.00, more preferably in the range of from about 1.20 to about 1.80, even more preferably in the range of from about 1.25 to about 1.80, yet even more preferably in the range of from about 1.30 to about 1.80, most preferably in the range of from about 1.30 to about 1.70.

The feature in the present polyurethane of a compression force deflection index as described above is characteristic a foam having a true integral skin as opposed, for example, to a foam having a non-porous surface but no distinct skin of substantially non-cellular polyurethane. As will be illustrated hereinbelow, in the latter type of foam, the non-porous surface confers little or no increase in compression force deflection of the foam compared to the foam core.

Another preferred feature of the present polyurethane foam is that it has a flexural modulus index of at least about 1.60, the flexural modulus index being defined as the ratio of (i) the flexural modulus of a sample of the foam (i.e. containing the integral skin) to (ii) the flexural modulus of the foam core (i.e. integral skin removed), the flexural modulus measured according to ASTM D790M-86. Preferably, the flexural modulus index of the present polyurethane foam is in the range of from about 1.8 to about 7.5, more preferably in the range of from about 2.0 to about 7.5. This feature is a relative measure of the flexural modulus of polyurethane foam (i.e. including foam core and the integral skin) and the foam core of the polyurethane foam (i.e. with integral skin removed), the flexural modulus being measured according to ASTM D790M-86. As is known in the art, flexural modulus is a measure of the stiffness of the foam without regard to the hardness of the foam. Thus, it is possible to have two materials having similar flexural modulus but different hardness. The improved properties of the present polyurethane foam renders it a useful replacement for current materials of similar flexural modulus. The advantage is that the hardness of the present polyurethane foam would be less than that of various materials having a similar flexural modulus. A prime example of this is the ability to utilize the present polyurethane foam in a vehicular pillar cover application. In this application, the conventional pillar cover is usually a hard plastic shell. The present polyurethane foam has an integral skin which confers a similar flexural modulus as the plastic shell with the added advantage of lower hardness thereby conferring overall energy management properties to the pillar cover.

Yet another preferred feature of the present polyurethane foam is that it has a density index of at least about 1.60, the density index being defined as the ratio of (i) the density of a first sample of the integral skin of the foam, the first sample having a thickness orthogonal to a plane of the integral skin of 2.5 mm, to (ii) the density of a second sample of the foam core (i.e. integral skin removed), the density measured according to ASTM D1622-93. Preferably, the density index of the present polyurethane foam is in the range of from about 1.7 to about 3.5, more preferably in the range of from about 1.9 to about 3.5, most preferably in the range of from about 2.1 to about 3.5. This feature is a relative measure of the density of the integral skin of the foam and the foam core of the polyurethane foam (i.e. with integral skin removed), the density being measured according to ASTM D1622-93.

The foam core of the present polyurethane foam has a density in the range of from about 5 to about 45 pounds per cubic foot. Preferably, the foam core has a density in the range of from about 10 to about 40, more preferably in the range of from about 13 to about 30, most preferably in the range of from about 15 to about 25, pounds per cubic foot.

Thus, the present polyurethane foam is blown without the use of organic carbon-based compounds yet still possess a non-porous, non-cellular distinct integral skin. To the knowledge of Applicant, a polyurethane foam possessing such a combination of properties was heretofore unknown.

Embodiments of the present invention will now be described with reference to the following Examples which should not be construed as limiting the scope of the invention. The term "pbw" used in the Examples refers to parts by weight. Further, the term "Low E.W. Polyol" refers to low equivalent weight polyol.

In the Examples the following compounds were used:

1. Polyol: Voranol™ 4701, a polyether polyol having an equivalent weight of approximately 1600 (molecular weight approximately 4800), commercially available from The Dow Chemical Company;

2. Polymer Polyol: E-815™, a polymer polyol consisting of a styrene-acrylonitrile graft polyether polyol (solids content approximately 43%) having an equivalent weight of approximately 2777, commercially available from Arco Chemical Company;

3. Low E.W. Polyol A: Desmophen™ 2001K, a polyethylene/polybutylene adipate polyester polyol with an equivalent weight of approximately 985 (molecular weight approximately 2000), commercially available from Bayer Corporation;

4. Low E.W. Polyol B: Poly-G™ 55-112, a polyether polyol with an equivalent weight of approximately 500 (molecular weight approximately 1000), commercially available from Olin Corporation;

5. Low E.W. Polyol C: Terol™ 250, an aromatic polyester polyol based on polyethylene terephthalate with an equivalent weight of approximately 224 (molecular weight approximately 450), commercially available from Oxid Inc.;

6. Cross-Linker A: Thanol™ 650-X, an aromatic amine-containing polyol with an equivalent weight of approximately 125 (molecular weight approximately 650), commercially available from Eastman Chemical Co.;

7. Cross-Linker B: Voranol™ 230-660, a polyether polyol with an equivalent weight of approximately 83 (molecular weight approximately 250), commercially available from The Dow Chemical Company;

8. Chain-Extender A: ethylene glycol;

9. Chain-Extender B: 1,4-butane diol;

10. Catalyst: Polycat™ 17, a tertiary amine polymerization catalyst containing a hydroxyl group with a hydroxyl number of approximately 353, commercially available from Air Products and Chemicals, Inc.;

11. Blowing Agent: water;

12. Isocyanate A: Lupranate™ MM-103, a carbodiimide modified 4,4'-diphenylmethane diisocyanate, commercially available from BASF Corporation; and 13. Isocyanate B: an isocyanate prepolymer prepared by reacting 4,4'-diphenylmethane diisocyanate with dipropylene glycol.

EXAMPLES 1–13

In these Examples, a series of foams in accordance with the present invention were produced along with a number of comparative foams. The formulations used in each Example are provided in Table 1. The amount of all ingredients in each formulation in Table 1 is reported in parts by weight.

TABLE 1

| | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Polyol | 72.3 | 74.6 | 72.3 | 72.3 | 72.3 | 72.3 | 72.3 | 72.3 | 72.3 | 72.3 | 72.3 | 73.2 | 74.6 |
| Polymer Polyol | 27.7 | — | — | — | — | — | — | — | — | — | — | — | — |
| Low E.W. Polyol A | — | — | — | — | — | — | — | — | — | 27.7 | 27.7 | 26.8 | 25.4 |
| Low E.W. Polyol B | — | — | — | — | — | — | — | — | 27.7 | — | — | — | — |
| Low E.W. Polyol C | — | 25.4 | 27.7 | 27.7 | 27.7 | 27.7 | 27.7 | 27.7 | — | — | — | — | — |
| Cross-Linker A | — | — | 8.8 | — | — | — | — | — | — | — | — | — | — |
| Cross-Linker B | — | — | — | 8.8 | — | — | — | — | — | — | — | — | — |
| Chain Extender A | 8.8 | — | — | — | — | 8.8 | 8.8 | 8.8 | 8.8 | 8.8 | 8.9 | 5.4 | — |
| Chain Extender B | — | — | — | — | 8.8 | — | — | — | — | — | — | — | — |
| Water | 0.66 | 0.61 | 0.66 | 0.66 | 0.66 | 0.66 | 0.66 | 0.66 | 0.66 | 0.66 | 1.2 | 0.64 | 0.60 |
| Catalyst | 1.1 | 1.0 | 1.1 | 1.1 | 1.1 | 1.1 | 1.1 | 1.1 | 1.1 | 1.1 | 1.1 | 1.3 | 1.5 |
| Isocyanate A | 64.1 | 35.5 | 44.7 | 47.8 | 75.5 | 56.4 | 79.6 | 98.5 | 70.8 | 66.4 | 89.3 | 59.6 | — |
| Isocyanate B | — | — | — | — | — | — | — | — | — | — | — | — | 43.6 |
| Isocyanate Index | 105 | 105 | 105 | 105 | 105 | 75 | 105 | 130 | 105 | 105 | 105 | 90 | 105 |

As will be apparent to those of skill in the art, the formulation used to produce the foam of Example 1 did not contain a low equivalent weight polyol (i.e. the second polyol discussed hereinabove) in the polyol mixture and thus, this Example is outside the scope of the invention and is provided for comparative purposes only. Indeed, Example 1 is a repeat of the foam produced according to U.S. Pat. No. 4,994,502 [Markovs et al.], incorporated by reference hereinabove. Further, the formulations used to produce the foams of Examples 2–4 and 13 did not contain a chain extending agent and thus, these Examples are outside the scope of the invention and are provided for comparative purposes only.

Generally, the polyurethane foam of each Example was prepared by initially preparing a resin blend comprising all ingredients except the isocyanate. The resin blend and the isocyanate were allowed to equilibrate to a temperature of 77° F. The resin blend and isocyanate were then independently fed to a high pressure mixhead at a pressure of approximately 3000 psi. The mixhead was operated to provide a throughput of approximately 150 grams reaction mixture per second. The reaction mixture emanating from the mixhead was dispensed into a preheated (105° F.) mold having the following dimensions: 10"×10"×2½". The mold was thereafter closed and the contained reaction mixture was allowed to expand to fill the mold. After approximately 3 minutes the foam product was demolded.

The Shore A Hardness of the foam of each Example was determined according to ASTM D2240. The results are reported in Table 2.

surface at the point at which densification of the foam began to occur. The distance from this point to the outer surface of the integral skin was then measured and the results are reported in Table 2.

The compression force deflection of the foam of each Example was determined according to ASTM 3574C, the contents of which are hereby incorporated by reference. In this test, foam test samples having the following overall dimensions were used: 2"×2"×1".

A first set of foam pieces for each Example was cut from the original bun (10"×10"×2½") and to provided a foam test sample comprising two parallel, opposed faces of dimension 2"×1" which had been in directed contact with the mold during production of the foam. In other words, any integral skin present on the foam test sample in question would be disposed on two parallel, opposed rectangular faces of the foam test sample in question. A load was applied to one of the larger, square surfaces (dimension 2"×2") of the foam test sample in question. The load required to achieve 50% deflection was determined and is reported in Table 2 as "CFD-Foam".

A second set of foam test samples for each Example was cut from the orginal bun (10"×10"×2½") similar to the first set of foam test samples with the exception that each surface of the foam test sample was freshly cut. In other words, the each of the second set of foam test samples was devoid of

TABLE 2

| | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Density - Core (pcf) | 17.6 | 19.7 | 18.8 | 17.9 | 16.8 | 16.6 | 16.0 | 15.1 | 16.9 | 18.2 | 10.2 | 17.1 | 18.6 |
| Density - Skin (pcf) | 23.7 | 21.2 | 22.4 | 22.3 | 38.7 | 42.3 | 43.1 | 45.7 | 38.7 | 34.8 | 18.0 | 36.2 | 23.8 |
| Density Index | 1.35 | 1.08 | 1.19 | 1.25 | 2.30 | 2.55 | 2.69 | 3.03 | 2.29 | 1.91 | 1.76 | 2.12 | 1.28 |
| Skin Thickness (mm) | none | none | none | none | 1.1 | 1.7 | 1.7 | 2.0 | 1.5 | 0.8 | 0.7 | 1.0 | none |
| Shore A Hardness | 85 | 30 | 55 | 46 | 89 | 59 | 91 | 97 | 85 | 75 | 50 | 43 | 20 |
| CFD - Foam Core (N) | 1446 | 286 | 524 | 561 | 791 | 302 | 1043 | 2422 | 1043 | 1030 | 125 | 119 | 105 |
| CFD - Foam (N) | 1646 | 333 | 606 | 586 | 1102 | 442 | 1389 | 4019 | 1408 | 1387 | 200 | 165 | 111 |
| CFD Index | 1.14 | 1.16 | 1.16 | 1.04 | 1.39 | 1.46 | 1.33 | 1.66 | 1.35 | 1.34 | 1.60 | 1.39 | 1.06 |
| FM - Foam Core (mPa) | 4.26 | 0.61 | 1.07 | 1.06 | 2.13 | 1.74 | 2.68 | 4.88 | 4.60 | 3.02 | 0.61 | 0.27 | 0.29 |
| FM - Foam (mPa) | 6.34 | 0.72 | 1.51 | 1.27 | 4.45 | 2.84 | 8.57 | 34.8 | 8.53 | 6.00 | 1.72 | 0.64 | 0.31 |
| FM Index | 1.49 | 1.18 | 1.41 | 1.20 | 2.09 | 1.63 | 3.20 | 7.13 | 1.85 | 1.99 | 2.82 | 2.37 | 1.07 |

The density of the foam produced in each Example was determined in the following manner. Using the general protocol described in U.S. Pat. No. 5,304,578 [Tamano et al.], the contents of which are hereby incorporated by reference two series of test samples were obtain for the foam of each Example. The first series of test samples for the foam of each Example was the skin of the foam cut at a thickness of 2.5 mm to provide a sample having the following dimensions: 2.5 mm×20 mm×100 mm. The density of each of the first series of test samples was determined according to ASTM D1622-93, the contents of which are hereby incorporated by reference, and the results are reported in Table 2 as "Density-Skin". The second series of test samples for the foam of each Example was the core of the foam to provide a sample having the following dimensions: 20 mm×100 mm×50 mm. The density of each of the second series of test samples was determined according to ASTM D1622-93, and the results are reported in Table 2 as "Density-Core". The density index was calculated as the ratio of "Density-Skin" to "Density-Core", and the results are reported in Table 2 as "Density Index".

The skin thickness of the foam of each Example was determined by visually marking the foam core near the skin any integral skin produced during production of the original foam bun. A load was applied to one of the larger, square surfaces (dimension 2"×2") of the foam test sample in question. The load required to achieve 50% deflection was determined and is reported in Table 2 as "CFD-Foam Core".

The compression force deflection index was calculated as the ratio of "CFD-Foam" to "CFD-Foam Core", and the results are reported in Table 2 as "CFD Index".

The flexural modulus of the foam of each Example was determined according to ASTM D790M-86, the contents of which are hereby incorporated by reference. In this test, foam test samples having the following overall dimensions were used: 10 mm×10 mm×250 mm.

A first set of foam pieces for each Example was cut from the orginal bun (10"×10"×2½") and to provided a foam test sample comprising two parallel, opposed faces of dimension 10 mm×250 mm, one of which had been in direct contact with the mold during production of the foam. In other words, any integral skin present on the foam test sample in question would be disposed on a single rectangular faces of the foam test sample in question. A load was applied to the surface of the foam test sample in question which had been in direct contact with the mold. The flexural modulus was then determined according to ASTM D790M and is reported in Table 2 as "FM-Foam".

A second set of foam test samples for each Example was cut from the original bun (10"×10"×2½") similar to the first set of foam test samples with the exception that each surface of the foam test sample was freshly cut. In other words, the each of the second set of foam test samples was devoid of any integral skin produced during production of the original foam bun. A load was applied to one of the rectangular surfaces (dimension 10 mm×250 mm) of the foam test sample in question. The flexural modulus was then determined according to ASTM D790M and is reported in Table 2 as "FM-Foam Core".

The flexural modulus index was calculated as the ratio of "FM-Foam" to "FM-Foam Core", and the results are reported in Table 2 as "FM Index".

As the restfits in Table 2 clearly demonstrate, omission of the low equivalent weight polyol (i.e. the second poly discussed hereinabove) from the polyol mixture results in a foam having no visually measurable skin, a relatively low density index and a relatively small compression force deflection and flexural modulus indices—see Example 1. Further, the results in Table 2 clearly demonstrate that omission of the chain extending agent from the formulation mixture results in a foam having no visually measurable skin, a relative low density index (1.08–1.28) and a relatively small compression force deflection (all less than 1.16) and flexural modulus (all less than 1.45) indices—see Examples 2–4 and 13.

In contrast the results for Examples 5–12 demonstrate, inter alia, that use of a formulation comprising a polyol mixture, an isocyanate, a catalyst, water and a chain extending agent as described above surprisingly and unexpectedly results in a visually detectable integral skin, a relatively high density index (1.76–3.03) and a significantly high compression force deflection (1.33–1.66) and flexural modulus (1.63–7.13) indices.

While the invention has been described hereinabove with reference to various preferred embodiments and specific Examples, it will be clearly understood by those of skill in the art that modifications to and variations of the preferred embodiments and specific Examples are possible which do not depart from the spirit and scope of the present invention. Accordingly, it is contemplated that such modifications to and variations of the preferred embodiments and specific Examples are encompassed by the invention.

What is claimed is:

1. A polyurethane foam essentially free of organic carbon-based blowing agent, the polyurethane foam comprising a foam core having a density of from about 5 to about 45 pounds per cubic foot and an integral skin consisting of substantially non-cellular, non-porous polyurethane, wherein the presence of the integral skin is characterized by a compression force deflection index of at least about 1.20, the compression force deflection index being defined as the ratio of (i) the compression force deflection orthogonal to a cross-section of the foam to (ii) the compression force deflection of the foam core, the compression force deflection measured according to ASTM 3574C.

2. The polyurethane foam defined in claim 1, wherein the compression force deflection index is in the range of from about 1.20 to about 2.00.

3. The polyurethane foam defined in claim 1, wherein the compression force deflection index is in the range of from about 1.20 to about 1.80.

4. The polyurethane foam defined in claim 1, wherein the compression force deflection index is in the range of from about 1.25 to about 1.80.

5. The polyurethane foam defined in claim 1, wherein the compression force deflection index is in the range of from about 1.30 to about 1.80.

6. The polyurethane foam defined in claim 1, wherein the compression force deflection index is in the range of from about 1.30 to about 1.70.

7. The polyurethane foam defined in claim 1, further characterized by a flexural modulus index of at least about 1.60, the flexural modulus index being defined as the ratio of (i) the flexural modulus of a sample of the foam to (ii) the flexural modulus of the foam core, the flexural modulus measured according to ASTM D790M-86.

8. The polyurethane foam defined in claim 7, wherein the flexural modulus index is in the range of from about 1.8 to about 7.5.

9. The polyurethane foam defined in claim 7, wherein the flexural modulus index is in the range of from about 2.0 to about 7.5.

10. The polyurethane foam defined in claim 1, further characterized by a density index of at least about 1.60, the density index being defined as the ratio of (i) the density of a first sample of the integral skin of the foam, the first sample having a thickness orthogonal to a plane of the integral skin of 2.5 mm, to (ii) the density of a second sample of the foam core, the density measured according to ASTM D1622-93.

11. The polyurethane foam defined in claim 10, wherein the density index is in the range of from about 1.7 to about 3.5.

12. The polyurethane foam defined in claim 10, wherein the density index is in the range of from about 1.9 to about 3.5.

13. The polyurethane foam defined in claim 10, wherein the density index is in the range of from about 2.1 to about 3.5.

14. The polyurethane foam defined in claim 1, wherein the foam core has a density of from about 10 to about 40 pounds per cubic foot.

15. The polyurethane foam defined in claim 1, wherein the foam core has a density of from about 13 to about 30 pounds per cubic foot.

16. The polyurethane foam defined in claim 1, wherein the foam core has a density of from about 15 to about 25 pounds per cubic foot.

17. The polyurethane foam defined in claim 1, wherein water is used as the sole blowing agent to produce the foam.

18. A process for producing a polyurethane foam having an integral skin using a blowing agent essentially free of organic carbon-based compounds, the process comprising the steps of:

contacting a polyol mixture, an isocyanate, an aqueous blowing agent, a catalyst and a chain extending agent to produce a reaction mixture, the polyol mixture consisting of a first polyol having an average equivalent weight greater than about 1000 and a second polyol having an average equivalent weight in the range of from about 150 to about 1000; and expanding the reaction mixture to produce the polyurethane foam;

wherein the chain extending agent is present in an amount in the range of from about 1 to about 15 parts by weight per one hundred parts by weight of the polyol mixture.

19. The process defined in claim 18, wherein the chain extending agent is a compound having at least two active hydrogens.

20. The process defined in claim 18, wherein the chain extending agent is selected from the group consisting of hydrazine, primary diamines, secondary diamines, amino alcohols, amino acids, hydroxy acids, glycols, diols, triols and mixtures thereof.

21. The process defined in claim 18, wherein the chain extending agent is selected from the group consisting of ethylene glycol, 1,4-butanediol, phenylene diamine, 1,4-cyclohexane-bis-(methylamine), ethylenediamine, diethylenetriamine, N-(2-hydroxypropyl)ethylenediamine, N,N'-di(2-hydroxypropyl)ethylenediamine, piperazine, 2-methylpiperazine and mixtures thereof.

22. The process defined in claim 18, wherein the chain extending agent is selected from the group consisting of phenylene diamine, 1,4-cyclohexane-bis-(methylamine), ethylenediamine, diethylenetriamine, N-(2-hydroxypropyl)-ethylenediamine, N,N'-di(2-hydroxypropyl) ethylenediamine, piperazine, 2-methylpiperazine and mixtures thereof.

23. The process defined in claim 18, wherein the chain extending agent is selected from the group consisting of ethylene glycol, 1,4-butanediol and mixtures thereof.

24. The process defined in claim 18, wherein the chain extending agent has an equivalent weight of less than about 100.

25. The process defined in claim 18, wherein the chain extending agent has an equivalent weight in the range of from about 20 to about 80.

26. The process defined in claim 18, wherein the chain extending agent has an equivalent weight in the range of from about 20 to about 50.

27. The process defined in claim 18, wherein the polyol mixture contains from about 40 to about 95 percent by weight of the first polyol and from about 5 to about 60 percent by weight of the second polyol.

28. The process defined in claim 18, wherein the polyol mixture contains from about 55 to about 95 percent by weight of the first polyol and from about 5 to about 45 percent by weight of the second polyol.

29. The process defined in claim 18, wherein the polyol mixture contains from about 65 to about 90 percent by weight of the first polyol and from about 10 to about 35 percent by weight of the second polyol.

30. The process defined in claim 18, wherein the aqueous blowing agent is water.

31. The process defined in claim 18, wherein the amount water is used in an amount in the range of from about 0.20 to about 5.0 parts by weight per one hundred parts by weight of the polyol mixture.

32. The process defined in claim 18, wherein the amount water is used in an amount in the range of from about 0.35 to about 2.0 parts by weight per one hundred parts by weight of the polyol mixture.

33. The process defined in claim 18, wherein the amount water is used in an amount in the range of from about 0.50 to about 1.2 parts by weight per one hundred parts by weight of the polyol mixture.

34. The process defined in claim 18, wherein the isocyanate is represented by the general formula:

$$Q(NCO)_i$$

wherein i is an integer of two or more and Q is an organic radical having the valence of i.

35. The process defined in claim 18, wherein the isocyanate is selected from the group comprising 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitlulene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polyisocyanates and mixtures thereof.

36. The process defined in claim 18, wherein the isocyanate is selected from the group consisting essentially of 2,4'-diphenylmethane diisocyanate, 4,4'-diphenylmethane diisocyanate and mixtures thereof.

37. The process defined in claim 18, wherein the isocyanate is a prepolymer.

38. The process defined in claim 18, wherein the isocyanate is used in an amount to provide an isocyanate index in the range of from about 60 to about 200.

39. The process defined in claim 18, wherein the isocyanate is used in an amount to provide an isocyanate index in the range of from about 70 to about 140.

40. The process defined in claim 18, wherein the isocyanate is used in an amount to provide an isocyanate index in the range of from about 90 to about 110.

41. The process defined in claim 18, wherein the chain extending agent is present in an amount in the range of from about 2 to about 12 parts by weight per one hundred parts by weight of the polyol mixture.

42. The process defined in claim 18, wherein the chain extending agent is present in an amount in the range of from about 4 to about 10 parts by weight per one hundred parts by weight of the polyol mixture.

* * * * *